Aug. 12, 1924.
A. P. BRUSH
INTERNAL COMBUSTION ENGINE
Filed Nov. 21, 1921
1,504,322
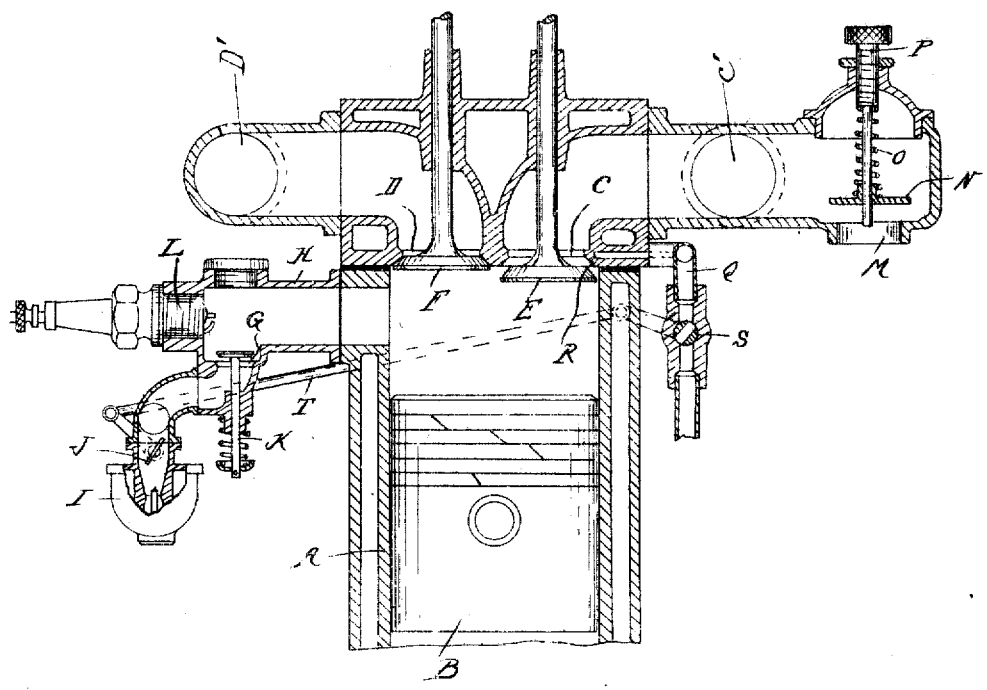
Inventor
Alanson P. Brush
By Whittemore Hall & Whittemore
Belknap       Attorneys Patented Aug. 12, 1924.

1,504,322

UNITED STATES PATENT OFFICE.

ALANSON P. BRUSH, OF DETROIT, MICHIGAN.

INTERNAL-COMBUSTION ENGINE.

Application filed November 21, 1921. Serial No. 516,597.

*To all whom it may concern:*

Be it known that I, ALANSON P. BRUSH, a citizen of the United States of America, residing at Detroit, in the county of Wayne and State of Michigan, have invented certain new and useful Improvements in Internal-Combustion Engines, of which the following is a specification, reference being had therein to the accompanying drawings.

The invention relates to internal combustion engines and has for its object the obtaining of greater efficiency in the operation of the engine under variable loads. It is usual to control internal combustion engines by the throttle, and consequently, to vary the density of the combustible charge which is introduced into the explosion chamber. With certain types of engines, as, for instance, the Diesel type, the fuel alone is controlled, but it is impractical with small units to employ this principle, especially where there is to be any great variation in speed range.

One of the reasons why it is practically impossible to control the fuel alone is that to initiate combustion there must be either high massed temperature, or high compression, or a definitely proportioned mixture of the fuel and air adjacent to the ignition point. If, therefore, the quality of the mixture applied by the carburetor is altered materially from the standard proportions, there is usually a failure of ignition. On the other hand, a mixture of air and fuel, which would not ignite by a spark, may be caused to burn if the temperature of such mixture can first be raised to a sufficiently high point, and again, an inert or non-combustible gas within the combustion chamber might be utilized in the development of power could it be kept from diluting the combustion mixture.

It is the primary object of the present invention to secure at all times a combustible mixture of fuel and air adjacent to the ignition point, such mixture being sufficient in quantity to operate the engine when idling. It is a further object to vary the quantity of fuel which is introduced into the explosion chamber without materially diminishing the quantity of air so that substantially uniform compression is maintained under varying loads and speeds. Such results I have accomplished by dividing the inlet to the explosion chamber and introducing through one division a combustible mixture of constant proportion, said introduction being adjacent to the ignition means, while through the other division air is introduced with a variable amout of fuel. The portions of the combustion chamber, with which the divisions of the inlet are respectively connected, are so arranged as to retard commingling and therefore the uniformly proportioned part will maintain its combustible character adjacent the ignition point until after ignition. The heat and pressure developed by the ignition of this portion of the charge will be sufficient to cause combustion of the fuel in the leaner mixture, or in case only air or inert gas is introduced, this will be utilized expansively in the development of power.

Various specific constructions may be used for carrying out my invention and in the drawings I have illustrated one construction diagrammatically. As shown, A is an engine cylinder of conventional type, B the piston therein, C an inlet port shown as arranged in the head communicating with the inlet manifold C', and D the exhaust port communicating with the exhaust manifold D', E and F are respectively the inlet and exhaust valves which are operated by suitably timed mechanism (not shown). G is the auxiliary inlet which is shown as entering the side of the cylinder near the end thereof, and H is a fitting adjacent to the entrance G which provides additional clearance space or an extension of the combustion chamber. I is a carburetor or other source of definitely proportioned combustible mixture of air and fuel. J is a throttle valve for controlling the mixture from the carburetor, and K is an automatic or spring-closed check valve which permits the introduction of the charge into the fitting H. L is a spark plug having its electrodes extending within the chamber H.

The main inlet C is unprovided with a carburetor but has an air entrance orifice M controlled by the check valve N. Tension is placed on this valve by the spring O, the pressure of which may be altered by adjustment of the threaded stem P. Q is a fuel supply conduit connecting with a port R in the inlet, preferably in the seat of the valve E. The fuel supply through this conduit Q is controlled by a throttle valve S, which is connected by suitable means, such as the rod T, to the throttle J, the arrangement being such that the fuel is only admitted to the port R when the throttle valve I approaches its open position.

In operation, the suction stroke of the piston B will draw in a well proportioned mixture of fuel and air by way of the carburetor I and fitting H. The inlet valve E will also be opened, but the valve N will remain on its seat until the vacuum in the cylinder will overbalance the resistance of the spring O. As a consequence, there will always be a sufficient quantity of carbureted air to fill the fitting H or some definite portion of the combustion chamber, while the remainder of the chamber will be supplied with air through the main inlet C. If the throttle J is in the position where the valve S connected therewith is closed, then only air will pass in through the main inlet C, but if the throttle J is wider opened, auxiliary fuel will pass through the conduit Q to the port R and will be commingled with the incoming air.

It will be obvious that with the construction just described the character of the charge introduced into the explosion chamber is dependent upon a number of factors; first, the adjustment or degree of opening of the throttle J; second, the speed of piston displacement; third, the resistance imposed by the valve N to the entrance of air through the orifice M. For example, if the throttle J is nearly closed and the engine is idling, a part of the charge is introduced by way of the carburetor, while a certain amount of uncarbureted air will enter through the main inlet C. Under such condition there will be sufficient combustible gas in the fitting H to be ignited by the spark plug L and sufficient power will be generated to operate the engine without load. If a load is thrown onto the engine, it will be necessary to open the throttle J, which, if the engine speed remains the same, will increase the quantity of carbureted air in proportion to the quantity of uncarbureted air entering the explosion chamber, which will develop greater power. If still greater load is thrown onto the engine and the throttle is opened further, the valve S will be opened to admit fuel through the port R, which, commingling with the air entering through the inlet C, will increase the power. On the other hand, if the load is decreased, the throttle J will be moved towards its closed position, which first will close the valve S and cut off the auxiliary fuel supply. If this does not reduce the piston speed, a further closing of the throttle will increase the quantity of uncarbureted air entering through the inlet C and will diminish the quantity of carbureted air entering the fitting H. Thus the quantity of fuel will be varied according to load, but without diminishing the compression pressure in the explosion chamber.

The success of the operation is insured by maintaining the proper quality of mixture in the portion of the gas which remains in the fitting H, which will insure ignition not only of the well proportioned mixture but also of the leaner mixture. The power developed, however, will be in proportion to the total amount of fuel introduced and greater efficiency is obtained by maintaining substantially constant compression.

What I claim as my invention is:

1. An internal combustion engine comprising a cylinder, a reciprocating piston therein, a combustion chamber at one end of said cylinder, two inlet passages into said combustion chamber, means to supply one of said inlet passages with a variable amount of combustible mixture, and means to supply the combustion chamber through the other inlet passage with either pure air or a mixture of air and fuel, and means whereby the supply of fuel through the latter inlet passage will come into operation only after the supply of mixture to the other inlet passage has approached its maximum.

2. An internal combustion engine comprising a cylinder, a reciprocating piston therein, a combustion chamber at one end of said cylinder, two inlets into said combustion chamber, means to supply a substantially uniform combustible mixture through one of said inlets, means to supply air through the other of said inlets, means for also supplying fuel through the other of said inlets, a valve controlling the amount of mixture admitted through said first mentioned inlet, a valve controlling the amount of liquid fuel admitted through the other of said inlets independently of the air passing therethrough, and a connection between said valves for obtaining a single control for the total amount of fuel supplied to said cylinder.

3. An internal combustion engine comprising a cylinder, a reciprocating piston therein, a combustion chamber at one end of said cylinder, two inlets into said combustion chamber, a throttle valve controlling one of said inlets, a carbureter connected to said throttle controlled inlet for supplying a substantially uniform combustible mixture, an air drag associated with the other of said inlets for admitting air therethrough, means for supplying liquid fuel to said other inlet, and a valve operated by said throttle valve for varying the amount of fuel supplied through said other inlet independently of the air passing therethrough.

In testimony whereof affix my signature.

ALANSON P. BRUSH.